April 7, 1942.  W. S. PRAEG  2,278,738
CUTTER
Filed Nov. 13, 1939
FIG.1.
FIG.2.
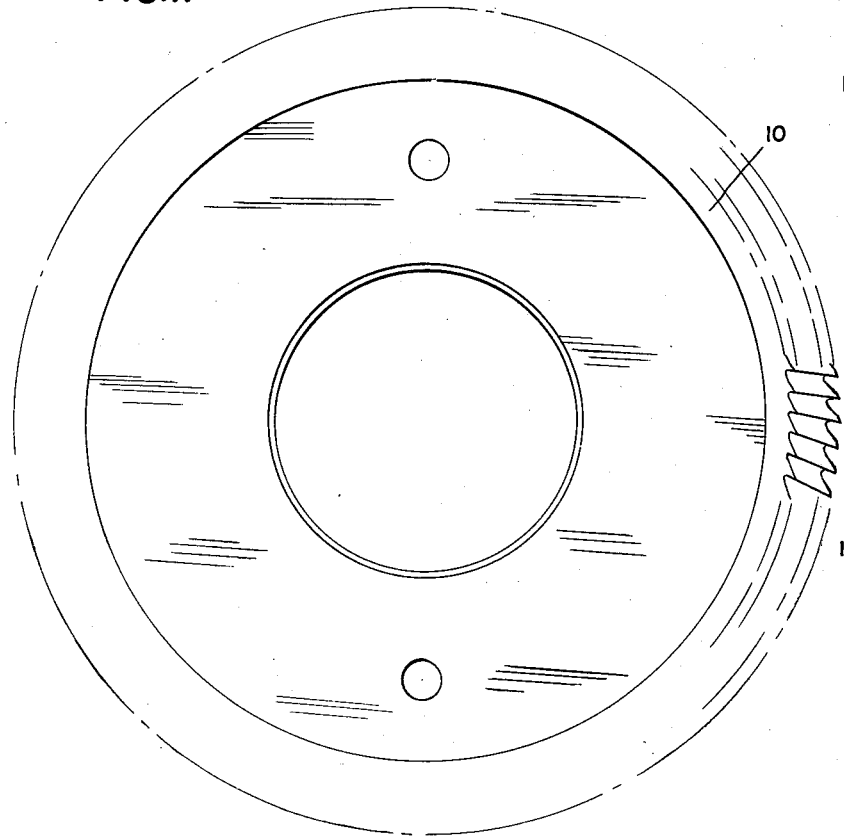
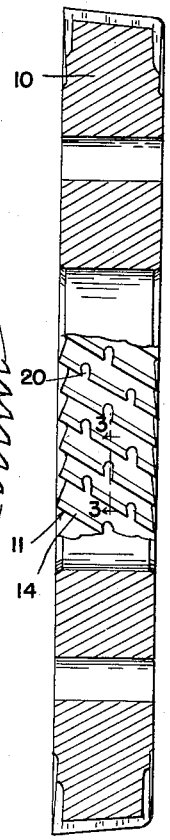
FIG.3.
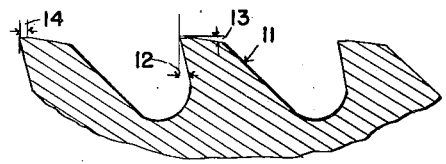
INVENTOR.
WALTER S. PRAEG
BY Whittemore, Hulbert
& Belknap  ATTORNEYS Patented Apr. 7, 1942

2,278,738

UNITED STATES PATENT OFFICE 2,278,738

CUTTER

Walter S. Praeg, Detroit, Mich., assignor to National Broach & Machine Company, Detroit, Mich., a corporation of Michigan Application November 13, 1939, Serial No. 304,247

3 Claims. (Cl. 29—103)

The present invention relates to a cutter and more particularly to a rotary metal cutting tool of the milling cutter type.

It is an object of the present invention to provide a cutter of the type described, characterized by the provision of notches extending through the cutting edge and adapted to break up the chip, to permit substantially greater depth of cut, and to reduce the power necessary.

Other objects of the invention will be apparent as the description proceeds, and when taken in conjunction with the accompanying drawing wherein:

Figure 1 is a side view of a cutter of the type described;

Figure 2 is a vertical section through the cutter; and

Figure 3 is an enlarged fragmentary sectional view taken on the line 3—3 of Figure 2.

I have illustrated a rotary cutter 10 having a plurality of teeth indicated generally at 11. As is conventional in cutters of this general type, each tooth is provided with front rake or hook as indicated at 12, and is provided with top clearance as indicated at 13 (Figure 3).

As seen in Figure 2 the cutter which I have shown for purposes of illustration is conical, although the invention is equally applicable to cylindrical or formed cutters. In addition, as shown in this figure, the teeth are formed with side clearance to permit the cutter to cut into a surface.

As best seen in Figure 2, a plurality of notches 20 are provided in each tooth, the notches 20 being staggered in adjacent teeth so that the portion left by the notch of one tooth will be removed by the next succeeding tooth. As shown in this figure, the notches 20 have side walls inclined outwardly in the direction opposite to the direction of rotation, thus providing side cutting clearance. This amount is slight, but it is important to preserve tool life.

Conveniently these notches may be ground with a grinder having a narrow cylindrical periphery and outwardly inclined end surfaces. This grinder is brought into contact with the top of the tooth with its center located rearwardly from the cutting edge so as to cut more deeply into the top of the tooth back of the front edge. Due to the outwardly inclined side walls of the grinder this will also provide the side clearance of the notches 20 previously referred to.

It was previously stated that the teeth 11 are provided with conventional top clearance, but this top clearance is not continued to the cutting edge. Instead, a land, as indicated at 14, is provided directly in back of each cutting edge. This land is preferably very small, and will ordinarily be less than .005 of an inch. In practice I have found that a land of .002 of an inch seems most satisfactory.

It will be understood that the notches 20 referred to extend through the cutting edge, through the land 14, and normally completely across the top of the tooth.

In addition to the obvious function of breaking up the chips, the notches 20 serve an additional important function in reducing the amount of power necessary to remove a given amount of metal. This reduction in power may be explained by the fact that substantially deeper cuts may be taken than with an unnotched cutter. The chips are small, and the upsetting of metal therein which accompanies every cutting operation is permitted in the small chips in three dimensions. Where the notches are omitted, the upsetting of the chip appears as a thickening of the chip and as a shortening of the chip in the direction of cut. In the present case, upsetting of the chip is also readily permitted in a direction perpendicular to the direction of cut.

While the dimensions of the notches will of course vary in different size cutters, I have found that notches of about $\frac{1}{8}$ of an inch wide and $\frac{1}{16}$ of an inch deep are suitable.

By way of example, I have practiced my invention with a cutter having a diameter of about 11½ inches, provided with 82 teeth. In this instance I provide a .002 inch land directly in back of the cutting edge, and the notches 20 are $\frac{1}{8}$ of an inch wide and $\frac{1}{16}$ of an inch deep. These notches are staggered so as to provide about $\frac{1}{16}$ of an inch offset between notches on adjacent teeth.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A rotary milling cutter of circular cross section having peripheral cutting teeth inclined to the axis of said cutter, each of said cutting teeth having a plurality of notches interrupting the cutting edges of said teeth and extending rearwardly therefrom, each of said notches extending in the plane of rotation of said cutter.

2. A rotary milling cutter of circular cross section having peripheral cutting teeth inclined to the axis of said cutter, each of said cutting teeth having a plurality of notches interrupting the cutting edges of said teeth and extending rearwardly therefrom, each of said notches extending in the plane of rotation of said cutter, all of the side walls of said notches being inclined rearwardly away from the said plane of rotation of said cutter to provide clearance in said notches.

3. A rotary milling cutter of circular cross-section having peripheral cutting teeth, said teeth having cutting edges formed by the intersection of the front and top surfaces thereof, said teeth having notches interrupting the cutting edges thereof and extending rearwardly therefrom in the plane of rotation along the tops of said teeth, said notches having side walls symmetrically shaped and located with respect to the plane of rotation of said cutter, the said side walls of said grooves being inclined rearwardly away from the plane of rotation to provide clearance in said notches.

WALTER S. PRAEG.